United States Patent
Forsythe et al.

(10) Patent No.: US 6,756,121 B2
(45) Date of Patent: Jun. 29, 2004

(54) CARBON BARRIER CONTROLLED METAL INFILTRATION LAYER FOR ENHANCED OXIDATION PROTECTION

(75) Inventors: George D. Forsythe, Landenberg, PA (US); Terence B. Walker, South Bend, IN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/358,528

(22) Filed: Feb. 5, 2003

(65) Prior Publication Data

US 2003/0143436 A1 Jul. 31, 2003

Related U.S. Application Data

(62) Division of application No. 09/708,891, filed on Nov. 8, 2000, now Pat. No. 6,555,173.

(51) Int. Cl.⁷ ............................................. B32B 9/00
(52) U.S. Cl. .................... 428/408; 428/304.4; 428/446; 428/457; 428/471
(58) Field of Search ................................ 428/408, 457, 428/304.4, 446, 471

(56) References Cited

U.S. PATENT DOCUMENTS 4,837,073 A * 6/1989 McAllister ................... 428/212
6,110,535 A * 8/2000 Rey et al. ................. 427/383.3

* cited by examiner

Primary Examiner—Deborah Jones
Assistant Examiner—Abraham Bahta
(74) Attorney, Agent, or Firm—Larry J. Palguta

(57) ABSTRACT

The invention provides for oxidatively resistant silicon carbide coated carbon/carbon composites, a method for the preparation of these materials, and their use in high temperature applications, preferably in brakes for airplanes. The silicon carbide coated C/C composite, which is resistant to oxidation at high temperatures, is prepared by a method comprising: (a) coating a C/C composite base with a reactive carbon containing composition to form a reactive carbon coated C/C composite; followed by (b) applying a silicon containing composition to the reactive carbon coated C/C composite to form a bi-layered C/C composite; (c) heating the bi-layered C/C composite to at least the melting point of silicon to form the silicon carbide coated C/C composite; and optionally (d) applying a retardant solution to the silicon carbide coated C/C composite wherein the retardant solution comprises the ions formed from the combination of the following: 10–80 wt % $H_2O$ and 90–20 wt % $H_3PO_4$.

12 Claims, No Drawings

CARBON BARRIER CONTROLLED METAL INFILTRATION LAYER FOR ENHANCED OXIDATION PROTECTION

CROSS REFERENCE TO RELATED APPLICATION

This application is a divisional of Application Ser. No. 09/708,891 filed Nov. 8, 2000, now U.S. Pat. No. 6,555,173 the entire contents of which is hereby expressly incorporated by reference.

FIELD OF THE INVENTION

The present invention provides for oxidatively resistant silicon carbide coated carbon/carbon (C/C) composites which comprise a C/C composite base that is strongly bound to a durable silicon carbide protective layer, a method for the preparation of these materials using a reactive carbon powder as a reactant in the step of forming the silicon carbide layer, and the use of the silicon carbide coated C/C composite in high temperature applications, preferably in brakes for airplanes.

BACKGROUND OF THE INVENTION

When the C/C composites are utilized as a stack of discs in airplane brakes, they are required to absorb large amounts of kinetic energy in order to stop the aircraft during landing or in the event of a rejected take-off. During some of the stops, the carbon is heated to sufficiently high temperatures that surfaces exposed to air will oxidize. Some conventional carbon composites have the necessary thermal and mechanical properties required for specific brake designs; however, these conventional composites have open porosities (typically 5% to 10%) which permit internal oxidation. The internal oxidation weakens the material in and around the brake rotor lugs or stator slots, which are areas that transmit the torque during braking.

Damage associated with oxidation has led to premature removal of carbon brake discs on a variety of aircraft, from all current brake manufacturers. Potassium or sodium has, at times, been identified in the severely oxidized regions, and alkali (e.g. sodium and potassium) and alkaline earth elements are well known to catalyze carbon oxidation. Catalyzed oxidation is carbon oxidation that is accelerated by the presence of contaminating materials. These contaminating materials come into contact with the brake from cleaning and de-icing chemicals used on aircraft, and, in particular, from de-icers used on airport runways. These liquids, and other deicers or cleaners containing K or Na, can penetrate the porous carbon discs leaving catalytic deposits within the pores. When such contamination occurs, the rate of carbon loss by oxidation can be increased by as much as two orders of magnitude. The ability of these materials to catalyze oxidation in brake materials has been verified in the laboratory.

It is a problem within this field of technology to protect C/C composites at elevated temperatures up to and exceeding 850° C., and to significantly reduce catalytic oxidation at normal operating temperatures. Both field data and theoretical models indicate that modern C/C aircraft brakes frequently see peak temperatures above 850° C. and that some models may experience extended periods between 800° C. to 1200° C. over their service lives.

A known method to improve oxidation resistance is by coating the non-friction surfaces of the composite with materials which act as oxidation inhibitors and seal the surface to limit oxygen access.

When a protective layer of silicon carbide is applied directly onto the C/C composite base, the silicon carbide is highly flaw sensitive. Breach of the silicon carbide layer may occur during the curing step when pressure and/or temperature changes are inadvertently performed too rapidly. Rapid thermal transients induced during component use can also be a major cause of cracking due to the thermal expansion difference between carbon and silicon carbide. Accordingly, what is desired is a method of forming a silicon carbide protective layer which is strongly bound to a C/C composite base wherein the silicon carbide layer is formed on a relatively flaw free smooth coherent surface.

Kaplan et al. (U.S. Pat. No. 5,283,109) teach a silicon carbide coated carbon composite formed with a carbon interlayer. The carbon interlayer is prepared by coating a carbon composite base with a paste-like mixture of carbon powder and a liquid carrier followed by curing. The coated carbon composite is then subjected to chemical vapor deposition with silicon carbide. Thus an open porous layer is needed to allow penetration of the chemical vapor. This final coated composite is inadequate for applications such as airplane brakes, due to a tendency for the composite to crack or peel under extreme conditions as a result of the relatively weak bond between the carbon interlayer and either the carbon composite base or the silicon carbide layer.

SUMMARY OF THE INVENTION

The present invention provides an oxidatively resistant C/C composite which is stable under extreme conditions.

The present invention, in part, is a recognition that further treating the SiC coated C/C composite with a phosphoric acid-based retardant solution significantly improves the oxidative resistance at the high end of the typical operating temperature range and in the presence of high concentrations of known oxidation catalysts, such as potassium acetate, a common constituent in aircraft runway deicers. The improvement to the oxidative resistance is unexpected in view of the apparent synergistic interaction between the SiC coating and the phosphoric acid-based retardant solution.

In particular, the present invention, in part, provides for a silicon carbide coated C/C composite, which is resistant to oxidation at high temperatures comprising:

(a) a base formed of a C/C composite,
(b) a layer of silicon carbide formed on a surface of the base (a), wherein the silicon carbide layer (b) is firmly bonded to the C/C composite base (a) through wicked silicon. The silicon carbide coated C/C composite may be further treated with a retardant solution which comprises the ions formed from the combination of the following: 10–80 wt % $H_2O$ and 90–20 wt % $H_3PO_4$.

For purposes of this disclosure, "wicking" is defined as the tendency for a liquid to travel along a fiber upon contact due to the affinity between the fiber and the liquid.

The present invention also provides, in part, a method for the preparation of these materials using a reactive carbon powder as a reactant in the step of forming the silicon carbide layer, and a method for the use of the silicon carbide coated C/C composite in high temperature applications.

The oxidatively resistant C/C composites according to the present invention are preferably used in brakes for airplanes, but may also be used in other high temperature applications, such as electrodes for arc melting of steel, mold stock for metal casting, rocket nozzles, furnace linings, and Hall cell anodes.

Advantages of the present invention will become more apparent from the detailed description given hereinafter.

However, it should be understood that the detailed description and specific examples, while indicating preferred embodiments of the invention, are given by way of illustration only, since various changes and modifications within the spirit and scope of the invention will become apparent to those skilled in the art from this detailed description

DETAILED DESCRIPTION OF THE INVENTION

The present invention includes a silicon carbide coated C/C composite, which is resistant to oxidation at high temperatures. The present invention further includes a method for forming such a composite, the method comprising:

(a) coating a C/C composite base with a reactive carbon containing composition to form a reactive carbon coated C/C composite, followed by (b) applying a silicon containing composition to the reactive carbon coated C/C composite to form a bi-layered C/C composite, (c) heating the bi-layered C/C composite to at least the melting point of silicon to form the silicon carbide coated C/C composite, and optionally (d) applying a retardant solution to the silicon carbide coated C/C composite wherein the retardant solution comprises the ions formed from the combination of the following: 10–80 wt % $H_2O$ and 90–20 wt % $H_3PO_4$.

The reactive carbon containing composition of step (a) is preferably a suspension of a reactive carbon powder. Any reactive carbon powder known in the art can be used, although the carbon powder should be essentially free of metals. The reactive carbon powder includes lampblack and colloidal graphite. Some examples include products AEROSPERSE 15V and AQUADAG E (marketed by the ACHESON CHEMICAL CO.).

It is preferred to heat the reactive carbon coated C/C composite formed in step (a) to 50–120° C. until essentially all volatiles are removed or until the rate of weight loss approaches zero.

The reactive carbon coated C/C composite formed in step (a) has a reactive carbon coating having an areal density of 0.00005–0.0020 $g/cm^2$. Preferably the areal density is 0.0007–0.0009 $g/cm^2$.

The silicon containing composition of step (b) is preferably a suspension of elemental silicon powder. The size of the silicon particles is not particularly limited so long as the coverage is homogeneous. It is preferred to use a fine silicon powder having a particle size of 0.1 to 100 microns. More preferably, the particle size should be 10 to 30 microns.

The type of suspension agent for both the reactive carbon containing composition of step (a) and the silicon containing composition of step (b) is not particularly limited, so long as the coatings can be applied relatively homogenously. Typical suspension agents may include ammonium alginate, gelatin, polyacrylic acid, polyvinylalcohol, vegetable gums, and modified starch products.

It is preferred to heat the bi-layered C/C composite formed in step (b) to 50–120° C. until essentially all volatiles are removed or until the rate of weight loss approaches zero.

Both the reactive carbon containing composition of step (a) and the silicon containing composition of step (b) can be applied by brush painting, dipping, or other painting techniques.

In step (c), the bi-layered C/C composite is heated to at least the melting point of silicon to form the silicon carbide coated C/C composite. Preferably, the bi-layered C/C composite is heated to 1400–1600° C.

The amount of elemental silicon powder applied to the reactive carbon coated C/C composite formed in step (a) is in a molar excess to the reactive carbon to ensure that essentially all of the reactive carbon converts to silicon carbide. Preferably, the weight of the elemental silicon powder is 1.5–2.5 times the weight of the reactive carbon powder. More preferably, the weight of the elemental silicon powder is 1.9–2.1 times the weight of the reactive carbon powder.

By applying an excess of elemental silicon, the unreacted liquid silicon infiltrates the C/C composite base by wicking, i.e, liquid silicon travels along the carbon fibers in a direction away from the surface of the C/C composite base. The infiltrated silicon is advantageous in that it strengthens the bond between the C/C composite base and the silicon carbide coating.

The amount of silicon should be chosen so that the infiltration of the excess silicon enters the C/C composite base to a depth (preferably) of at least 0.5 mm and should not reach a depth (preferably) of greater than 5 mm. When the depth is less than 0.5 mm, the strength of the bond between the C/C composite base and the silicon carbide protective layer is undesirably low. Additionally, when the depth is greater than 5 mm, the friction property of the C/C composite becomes undesirably low, which also lowers its resistance to oxidative attack.

During the heat treatment step (c) wherein the silicon powder is melted and excess silicon wicks along the carbon fibers, there is a partial conversion of the wicked silicon to SiC. The amount of wicked silicon which is converted to SiC can be controlled by varying the duration and temperature of the heat treatment step (c). That is, the amount of wicked silicon which is converted will increase with the temperature and duration of the heat treatment step (c). Theoretically, it is possible to convert all of the wicked silicon to SiC, but it is preferred to have less than 98wt % of the wicked silicon convert to SiC. More preferably, less than 50wt % of the wicked silicon is converted to SiC. Most preferably, less than 10 wt % of the wicked silicon is converted to SiC. It is preferred to reduce the conversion of the silicon to SiC, since the mechanical advantages of the SiC do not outweigh the added cost of the energy input requirements.

The ability to control both the high reaction rate between the reactive carbon layer and the liquid silicon to form SiC and the slow rate of wicking allows for the concurrent formation of a thin relatively defect free layer of silicon carbide along with a desired amount of silicon wicking. The wicked silicon firmly binds the silicon carbide layer to the C/C composite base.

The present invention, in part, includes further treating the silicon carbide coated C/C composite with a phosphoric acid-based retardant solution which comprises the ions formed from the combination of the following: 10–80 wt % $H_2O$ and 90–20 wt % $H_3PO_4$.

The phosphoric acid-based retardant solution preferably comprises the ions formed from the combination of the following: 10–80 wt % $H_2O$, 20–70 wt % $H_3PO_4$, 0–25 wt % $MnHPO_4 \cdot 1.6H_2O$, 0–30 wt % $AlPO_4$, 0–2 wt % $B_2O_3$, 0–10 wt % $Zn_3(PO_4)_2$ and 0.1–25 wt % alkali metal mono-, di-, or tri-basic phosphate, wherein at least one of $AlPO_4$, $MnHPO_4 \cdot 1.6H_2O$, and $Zn_3(PO_4)_2$ is present.

The present invention, in part, includes a phosphoric acid-based retardant solution which comprises the ions formed from the combination of the following: 20–50 wt % $H_2O$, 30–55 wt % $H_3PO_4$, and 5–20 wt % alkali metal mono-, di-, or tri-basic phosphate by weight.

The present invention, in part, includes a phosphoric acid-based retardant solution which comprises the ions formed from the combination of the following: 20–50 wt % $H_2O$, 30–55 wt % $H_3PO_4$, 0–15 wt % $MnHPO_4 \cdot 1.6H_2O$, 2–15 wt % $AlPO_4$, 0.5–2 wt % $B_2O_3$, 1–7 wt % $Zn_3(PO_4)_2$ and 10–20 wt % alkali metal mono-, di-, or tri-basic phosphate by weight.

The present invention, in part, includes a phosphoric acid-based retardant solution which comprises the ions formed from the combination of the following: 20–50 wt % $H_2O$, 30–55 wt % $H_3PO_4$, 2–15 wt % $AlPO_4$, 0.5–2 wt % $B_2O_3$, and 10–20 wt % alkali metal mono-, di-, or tri-basic phosphate by weight.

The present invention, in part, includes a phosphoric acid-based retardant solution which comprises the ions formed from the combination of the following: 20–50 wt % $H_2O$, 30–55 wt % $H_3PO_4$, 1–7 wt % $Zn_3(PO_4)_2$ and 10–20 wt % alkali metal mono-, di-, or tri-basic phosphate by weight.

The present invention, in part, includes a phosphoric acid-based retardant solution which comprises the ions formed from the combination of the following: 20–50 wt % $H_2O$, 30–55 wt % $H_3PO_4$, 2–15 wt % $MnHPO_4 \cdot 1.6H_2O$ and 10–20 wt % alkali metal mono-, di-, or tri-basic phosphate by weight.

Preferably, the alkali metal mono-, di-, or tri-basic phosphate is selected from the group consisting of $NaH_2PO_4$, $KH_2PO_4$ and mixtures thereof. $KH_2PO_4$ is most preferred.

The present invention, in part, includes a retardant solution which contains essentially no HCl, tin oxides, silicon oxides, titanium oxides or lithium compounds.

Carbon/Carbon Substrate

Carbon-carbon composites are generally prepared from carbon preforms. Carbon preforms are made of carbon fibers, which may be formed from pre-oxidized acrylonitrile resin. In one embodiment, these fibers can be layered together to form a shape, such as a friction brake. The shape is heated and infiltrated with methane or another pyrolyzable carbon source to form the carbon-carbon composites. In one embodiment, the carbon-carbon composite has a density from about 1.6 to about 1.9 g/cm$^3$. A particularly useful carbon-carbon composite has a density of about 1.75 g/cm$^3$. Carbon-carbon composites and methods of their manufacture are known to those in the art. Several U.S. patents describing C/C composites which would be useful in this invention include U.S. Pat. Nos. 5,402,865; 5,437,352; 5,494,139; 5,944,147; 5,699,881; 5,819,882; 5,926,932; 5,143,184; 4,955,123; 5,184,387; 5,113,568; 5,081,754; 5,323,523; 5,705,264; 5,737,821; 5,882,781; 5,388,320; 5,664,305; and 5,962,135 each of which is incorporated herein by reference in their entirety.

Even though the invention may be applied to various carbon/carbon materials, testing and evaluation, as described below, was performed on CARBENIX® brand of carbon/carbon composite material marketed by HONEYWELL INTERNATIONAL, Inc. (formerly ALLIEDSIGNAL, Inc.).

Treatment Application

The C/C composite friction material to be protected is masked so that all friction surfaces will remain unaltered. The remaining surfaces comprising the inside and outside surfaces of the disks, non-friction back faces where present, and all surfaces of the insert and anti-rotation notches are covered by brushing or alternatively by spraying with a layer of a carbon suspension to such a level as to fill random surface defects, and leave a substantially continuous layer of carbon at a nominal areal density of 0.005 g/in$^2$. (approx. 0.0008 g/cm$^2$). A suitable suspension for this coating comprises 1 part of a carbon black particulate named "AEROSPERSE 15V" and 2 parts de-ionized (DI) water containing approx. ½% of the suspension aid "SUPERLOID" marketed by KELCO ALGINATES (an ammonium alginate compound). The coated materials are air dried in an oven at 70–100° C. for such time as is necessary to stop further weight loss.

An alternative method for preparing the C/C composite with a reactive carbon coating is to place the C/C composite in a very smoky flame. This is not the preferred method, since it is not easy to control.

The coated materials are overcoated by spraying with an aqueous suspension of pure silicon powder (approx. 20 micron particle size). A suitable goal for this coating would be an areal density of 0.15 g/in$^2$. A typical recipe for this spray is: 17 g of ½% SUPERLOID in DI water, 23 g of DI water, 53 g of Si powder (20 micron size). The coated materials are again air. dried in an oven at 70–100 deg C. for such a time as necessary to stop further weight loss.

The twice coated material is placed in a vacuum furnace and heated to approximately 1450° C. for 1 hour to complete the process.

Coated Composite Preparation

Sample disks of C/C composite brake material ("coupons") were prepared for oxidation rate testing. These samples were in the form of disks, all cut for use from the same commercial C/C brake rotor. The disks were machined to approximately two (2) inches in diameter, and the circular faces were ground flat to approximately 0.25 inch thickness to form the uncoated sample coupons. An uncoated sample coupon, denoted Comparative Example 1, was tested for oxidative resistance, and the results are given in the following table.

Inventive Examples 1–3 were prepared by coating the sample coupons with a SiC layer. The coupons were first coated with a layer of carbon black dispersed in deionized water containing 0.5 % of an ammonium alginate polymer as a suspension aid. The coating thickness was maintained in the range 0.005–0.010 gm/in$^2$. This coating was dried in an air oven at ~75° C. Using a suspension of silicon powder (−20 mesh) in deionized water containing 0.5% of an ammonium alginate polymer as a suspension aid, a second coating was applied over the carbon black layer at a rate of 0.05–0.20 gm/in$^2$. After oven drying at ~75° C., the coated disks were placed in a vacuum furnace and heated to 1450° C. The sample disks were held at this temperature for one hour, and then cooled to room temperature before removal from the furnace to form the SiC coated C/C composite coupons.

Comparative Examples 2 and 3 were prepared by painting solutions of Retardants A and B, respectively, on the uncoated sample coupons. Likewise, Inventive Examples 2 and 3 were prepared by painting solutions of Retardants A and B, respectively, on SiC coated C/C composite coupons.

Retardant A was prepared by combining 29.6 wt % $H_2O$, 49.5 wt % $H_3PO_4$ (85%), 2.9 wt % $MnHPO_4$, 13.6 wt % $AlPO_4$, 0.9 wt % $B_2O_3$, and 3.5 wt % $Zn_3(PO_4)_2$ as described in U.S. Pat. No. 4,837,073. Retardant B is essentially equivalent to Retardant A, except Retardant B also includes 12 wt % of potassium dihydrogen phosphate ($KH_2PO_4$), as described in Walker at al copending U.S. Ser. No. 09/507,414, filed Feb. 18, 2000 which is herein incorporated by reference in its entirety. These solutions were painted onto all exposed surfaces of the test disk, and then dried at room temperature, followed by a 600° C. curing step. Two layers of coatings were applied to the coupons.

Oxidative Resistance Testing

The sample coupons were weighed, and then exposed to a cyclic heating in air using a cycle of the following description:

1. Immerse in 1000° C. for 1 min.
2. Cool to 871° C. (1600° F.)
3. Maintain at temperature for 4 hours
4. Cool to room temperature.

After each cycle, the sample coupons were weighed, and the percent weight loss due to oxidation was recorded.

TABLE

| | Weight Loss (%) | | |
|---|---|---|---|
| | After 1 Cycle | After 2 Cycles | After 3 Cycles |
| Comparative Example 1. Unprotected C/C | 70% | Consumed | |
| Comparative Example 2. C/C plus retardant A | 15.3% | 29.8% | 42.5% |
| Comparative Example 3. C/C plus retardant B | 8.5% | 19.2% | 29.0% |
| Inventive Example 1. C/C plus SiC | 11.8% | 23.5% | 34.1% |
| Inventive Example 2. C/C plus SiC and Retardant A* | 0.3* | 0.7* | 1.0* |
| Inventive Example 3. C/C plus SiC and Retardant B | 0.1% | 0.3% | 0.4% |

*These are calculated values based on non-cyclic oxidation test results.

When comparing the results of Inventive Example 1 with Comparative Example 1, it is clear that coating the C/C composite with an SiC coating improves the oxidative resistance of the C/C composite. After two heat cycles, the unprotected Comparative Example 1 coupon was consumed, whereas the SiC coated C/C composite only lost 23.5 wt %.

It was completely unexpected to find such a dramatic increase in oxidative resistance when the SiC coated coupons were painted with the retardant solutions. This synergistic effect produced by combining the SiC coating with the retardant solutions results in a dramatic increase in oxidative resistance of up to 33.9%.

Without being bound to theory, it is assumed that the synergistic effect is due to the fact that the phosphate compounds, which have inherent oxidation resistant properties, are less likely to be volatilized due to the SiC coating and the phosphate compounds tend to block the passage of oxygen into the interior of the composite by migration into the microcracks of the SiC coating.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A silicon carbide coated (c/c) composite, which is resistant to oxidation above 850° C., comprising:
    (a) a base formed of a C/C composite,
    (b) a layer of silicon carbide formed on a surface of the base (a), wherein the silicon carbide layer (b) is firmly bonded to the C/C composite base (a) through wicked silicon.

2. The silicon carbide coated C/C composite according to claim 1, wherein the silicon carbide coated C/C composite has been treated with a retardant solution which comprises the ions formed from the combination of the following: 10–80 wt % $H_2O$ and 90–20 wt % $H_3PO_4$.

3. A silicon carbide coated (C/C) composite, which is resistant to oxidation at above 850° C., comprising:
    (a) a base formed of a C/C composite,
    (b) a layer of silicon carbide formed on a surface of the base (a), wherein the silicon carbide layer (b) is firmly bonded to the C/C composite base (a) through wicked silicon,
  wherein the wicked silicon is 0.5–5 mm beneath the surface of the C/C composite base (a) as measured in a direction normal to the surface of the base (a).

4. The silicon carbide coated C/C composite according to claim 1, wherein the wicked silicon is 1–4 mm beneath the surface of the C/C composite base (a) as measured in a direction normal to the surface of the base (a).

5. The silicon carbide coated C/C composite according to claim 2, wherein the silicon carbide coated C/C composite has been treated with a retardant solution which comprises the ions formed from the combination of the following: 10–80 wt % $H_2O$, 20–70 wt % $H_3PO_4$, 0–25 wt % $MnHPO_4 \cdot 1.6H_2O$, 0–30 wt % $AlPO_4$, 0–2 wt % $B_2O_3$, 0–10 wt % $Zn_3(PO_4)_2$ and 0.1–25 wt % alkali metal mono-, di-, or tri-basic phosphate, wherein at least one of $AlPO_4$, $MnHPO_4 \cdot 1.6H_2O$, and $Zn_3(PO_4)_2$ is present.

6. The silicon carbide coated C/C composite according to claim 5, wherein the silicon carbide coated C/C composite has been treated with a retardant solution which comprises the ions formed from the combination of the following: 20–50 wt % $H_2O$, 30–55 wt % $H_3PO_4$, and 5–20 wt % alkali metal mono-, di-, or tri-basic phosphate by weight.

7. The silicon carbide coated C/C composite according to claim 5, wherein the silicon carbide coated C/C composite has been treated with a retardant solution which comprises the ions formed from the combination of the following: 20–50 wt % $H_2O$, 30–55 wt % $H_3PO_4$, 0–15 wt % $MnHPO_4 \cdot 1.6H_2O$, 2–15 wt % $AlPO_4$, 0.5–2 wt % $B_2O_3$, 1–7 wt % $Zn_3(PO_4)_2$ and 10–20 wt % alkali metal mono-, di-, or tri-basic phosphate by weight.

8. The silicon carbide coated C/C composite according to claim 5, wherein the silicon carbide coated C/C composite has been treated with a retardant solution which comprises the ions formed from the combination of the following: 20–50 wt % $H_2O$, 30–55 wt % $H_3PO_4$, 2–15 wt % $AlPO_4$, 0.5–2 wt % $B_2O_3$, and 10–20 wt % alkali metal mono-, di-, or tri-basic phosphate by weight.

9. The silicon carbide coated C/C composite according to claim 5, wherein the silicon carbide coated C/C composite has been treated with a retardant solution which comprises the ions formed from the combination of the following: 20–50 wt % $H_2O$, 30–55 wt % $H_3PO_4$, 1–7 wt % $Zn_3(PO_4)_2$ and 10–20 wt % alkali metal mono-, di-, or tri-basic phosphate by weight.

10. The silicon carbide coated C/C composite according to claim 5, wherein the silicon carbide coated C/C composite has been treated with a retardant solution which comprises the ions formed from the combination of the following: 20–50 wt % $H_2O$, 30–55 wt % $H_3PO_4$, 2–15 wt % $MnHPO_4 \cdot 1.6H_2O$ and 10–20 wt % alkali metal mono-, di-, or tri-basic phosphate by weight.

11. The silicon carbide coated C/C composite according to claim 5, wherein the alkali metal mono-, di-, or tri-basic phosphate is selected from the group consisting of $NaH_2PO_4$, $KH_2PO_4$ and mixtures thereof.

12. The silicon carbide coated C/C composite according to claim 5, wherein the retardant solution contains essentially no HCl, tin oxides, silicon oxides, titanium oxides or lithium compounds.

* * * * *